(12) United States Patent
Shih

(10) Patent No.: US 6,646,882 B2
(45) Date of Patent: Nov. 11, 2003

(54) STRUCTURE OF REDUNDANT ARRAYS OF INEXPENSIVE DISKS (R.A.I.D.) WITH SERVERS

(76) Inventor: Shoei-Yuan Shih, No. 8, Lane 85, Hsing-I Rd., Pei-Tou Dist., Taipei (TW)

( * ) Notice: Subject to any disclaimer, the term of this patent is extended or adjusted under 35 U.S.C. 154(b) by 42 days.

(21) Appl. No.: 10/067,251

(22) Filed: Feb. 7, 2002

(65) Prior Publication Data

US 2003/0147218 A1 Aug. 7, 2003

(51) Int. Cl.[7] .................................................. G06F 1/20
(52) U.S. Cl. ........................ 361/724; 361/685; 439/61; 312/223.3
(58) Field of Search ................................ 361/724–727, 361/685–687; 439/61, 928.1, 928, 929, 59, 62; 312/223.1–223.3; 364/708.1

(56) References Cited

U.S. PATENT DOCUMENTS 6,018,456 A * 1/2000 Young et al. ............... 361/684
6,148,352 A * 11/2000 Coale et al. ................ 710/100
6,411,506 B1 * 6/2002 Hipp et al. ................. 361/686
6,442,022 B1 * 8/2002 Paul .......................... 361/685

* cited by examiner

Primary Examiner—Darren Schuberg
Assistant Examiner—Hung Van Duong
(74) Attorney, Agent, or Firm—Birch, Stewart, Kolasch & Birch, LLP

(57) ABSTRACT

A structure of redundant arrays of inexpensive disks (R.A.I.D.) with servers is disclosed. The structure of the invention includes a R.A.I.D., a server, and a housing. The connection between the R.A.I.D. and the server, and the connection between the server and the housing are achieved by connectors respectively formed on edges of the R.A.I.D., the server and the housing. Thereby, the device space and wiring limitation can be overcome.

9 Claims, 8 Drawing Sheets

US 6,646,882 B2

STRUCTURE OF REDUNDANT ARRAYS OF INEXPENSIVE DISKS (R.A.I.D.) WITH SERVERS

FIELD OF THE INVENTION

The invention relates to a structure of redundant arrays of inexpensive disks (R.A.I.D.) with servers. More specifically, the invention relates to a structure which has a server installed directly on a R.A.I.D.

BACKGROUND OF THE INVENTION

An industrious specification for computer housing includes 1U, 2U, 3U and 4U. The limit to the interior space of the computer housing for arranging devices greatly influences the performance of the computer. Usually, a computer housing of 3U specification is used as a memory cell. A plurality of hard disks are arranged in the front half space of the 3U housing to form the R.A.I.D. A power supply and an electric fan are arranged in the remaining space of the 3U housing. Under such an arrangement, a control panel can be mounted only in the remaining space. Because of the limited space, a server, including a motherboard, CD-ROM drives, and floppy drives, has to be mounted in another computer housing of 1U or 2U specification and connected to other devices through buses. However, this arrangement has several problems, such as:

1. The control panel can be installed in a same housing with the hard disks. But the control panel is usually mounted face inward. Therefore, either the control panel has to be turned back until it faces outward or a user has to change his(her) position in a manner to face the control panel. It is thus not user-friendly.

2. The motherboard and the R.A.I.D. are mounted in different housings, which needs longer signal wires for connection and transmission. Longer signal wires may cause signal decay and complicate the wiring of the devices.

3. Since the motherboard is mounted in another housing, an additional power supply is needed for the motherboard and therefore the equipment cost is increased.

SUMMARY OF THE INVENTION

It is therefore a principal object of the invention to provide a structure in which a server is mounted directly on redundant arrays of inexpensive disks (R.A.I.D.) so that more devices can be received in a same housing.

It is another object of the invention to provide a control panel for controlling the R.A.I.D. that is formed in front of the server, while the distance between the internal connections is reduced and a power supply can be shared. Thereby, the prior problems can be solved.

In order to achieve the above and other objectives, a structure of R.A.I.D. with servers is provided. The structure of the invention includes a R.A.I.D., a server, and a housing. The connection between the R.A.I.D. and the server, and the connection between the server and the housing are achieved by connectors respectively formed on edges of the R.A.I.D., the server and the housing. Thereby, the device space and wiring limitations can be overcome.

BRIEF DESCRIPTION OF THE DRAWINGS

The drawings included herein provide a further understanding of the invention and, incorporated herein, constitute a part of the invention disclosure. A brief introduction of the drawings is as follows.

DESCRIPTION OF THE PREFERRED EMBODIMENTS

Figure 1:
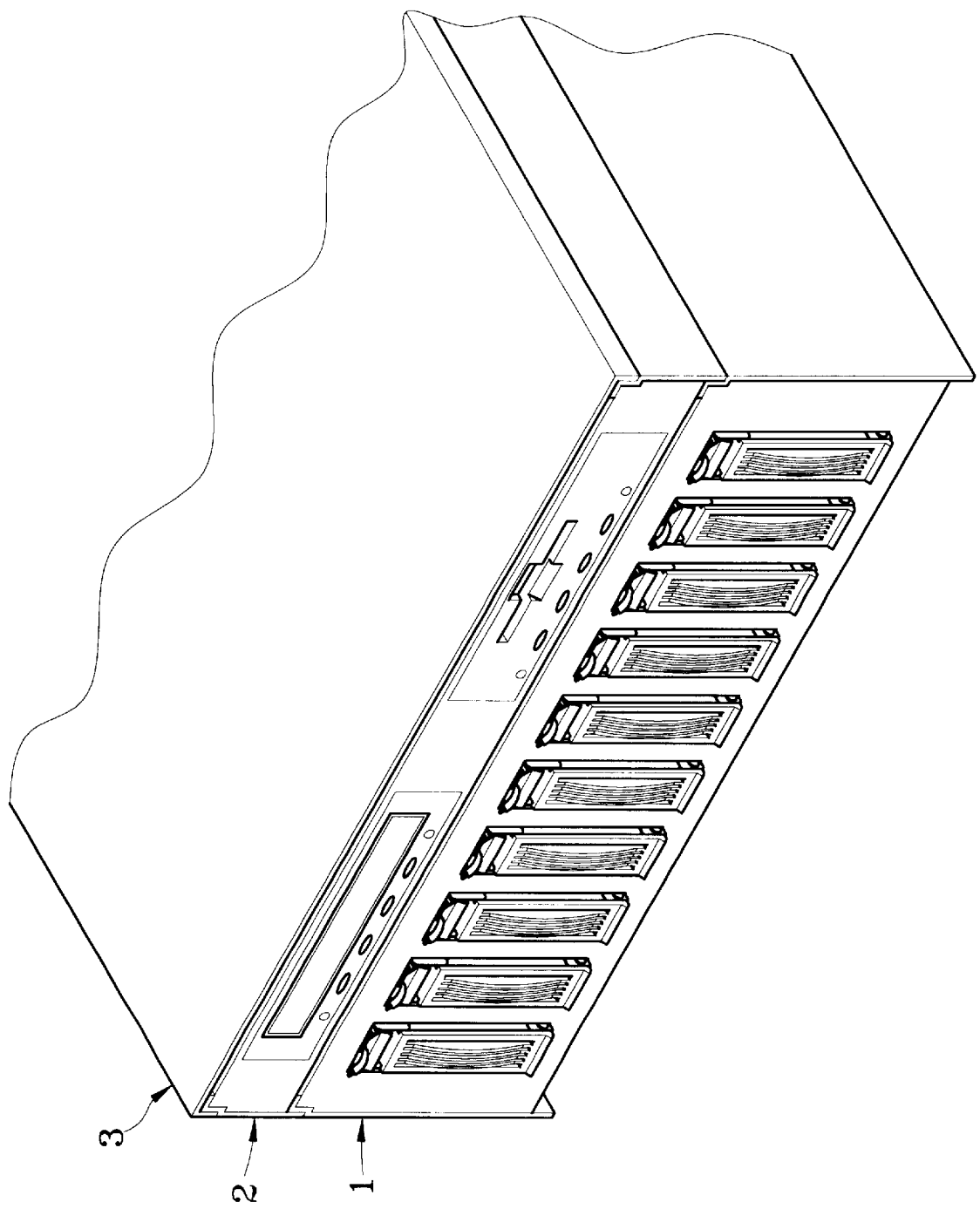
FIG. 1 is a schematic view of a structure of redundant arrays of inexpensive disks (R.A.I.D.) with servers according to one embodiment of the invention.

Wherever possible in the following description, similar reference numerals and symbols will refer to similar elements unless otherwise illustrated.

Figure 2A:
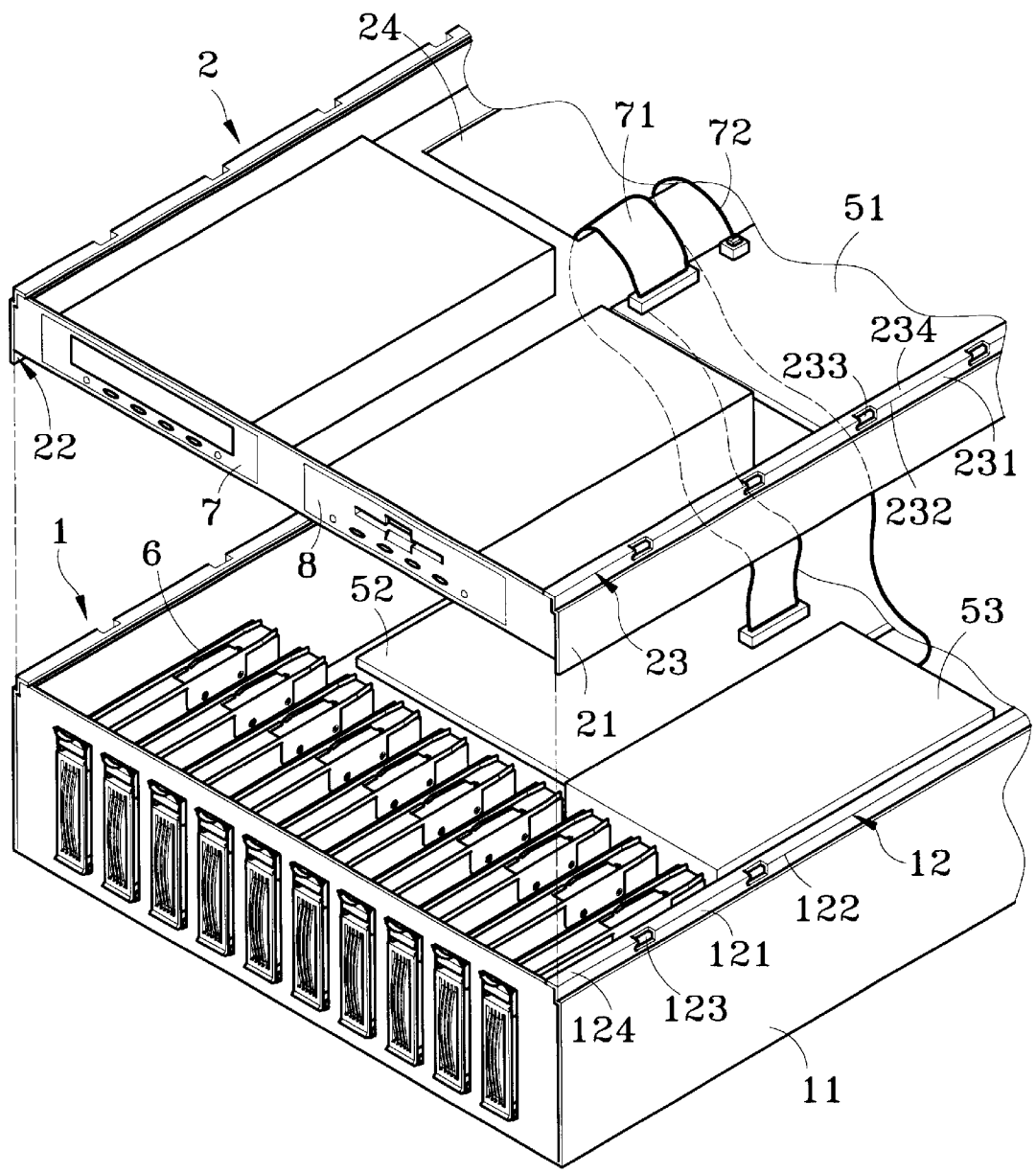
FIG. 2A and FIG. 2B are exploded views of FIG. 1.
Figure 2B:
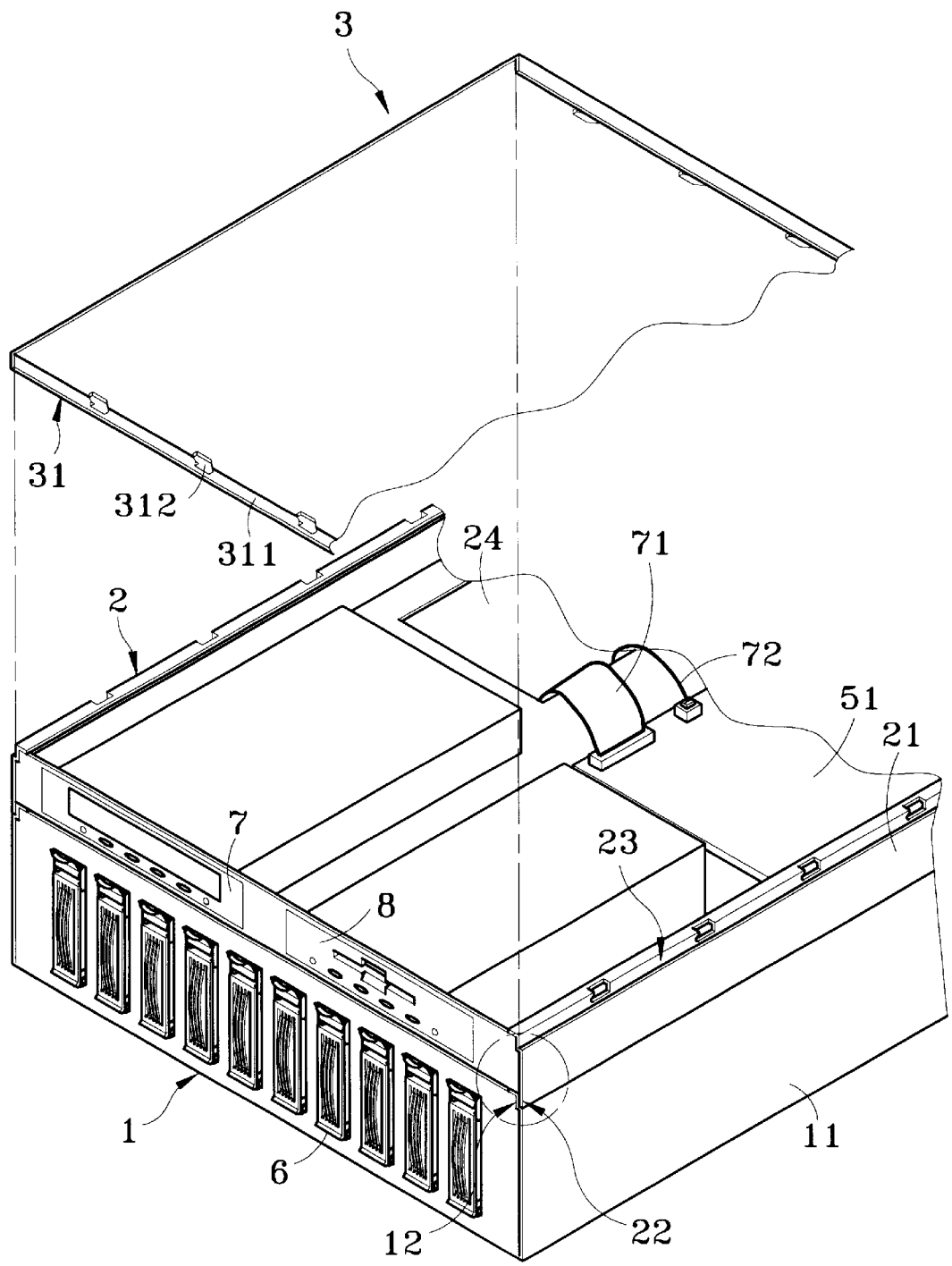
Figure 2C:
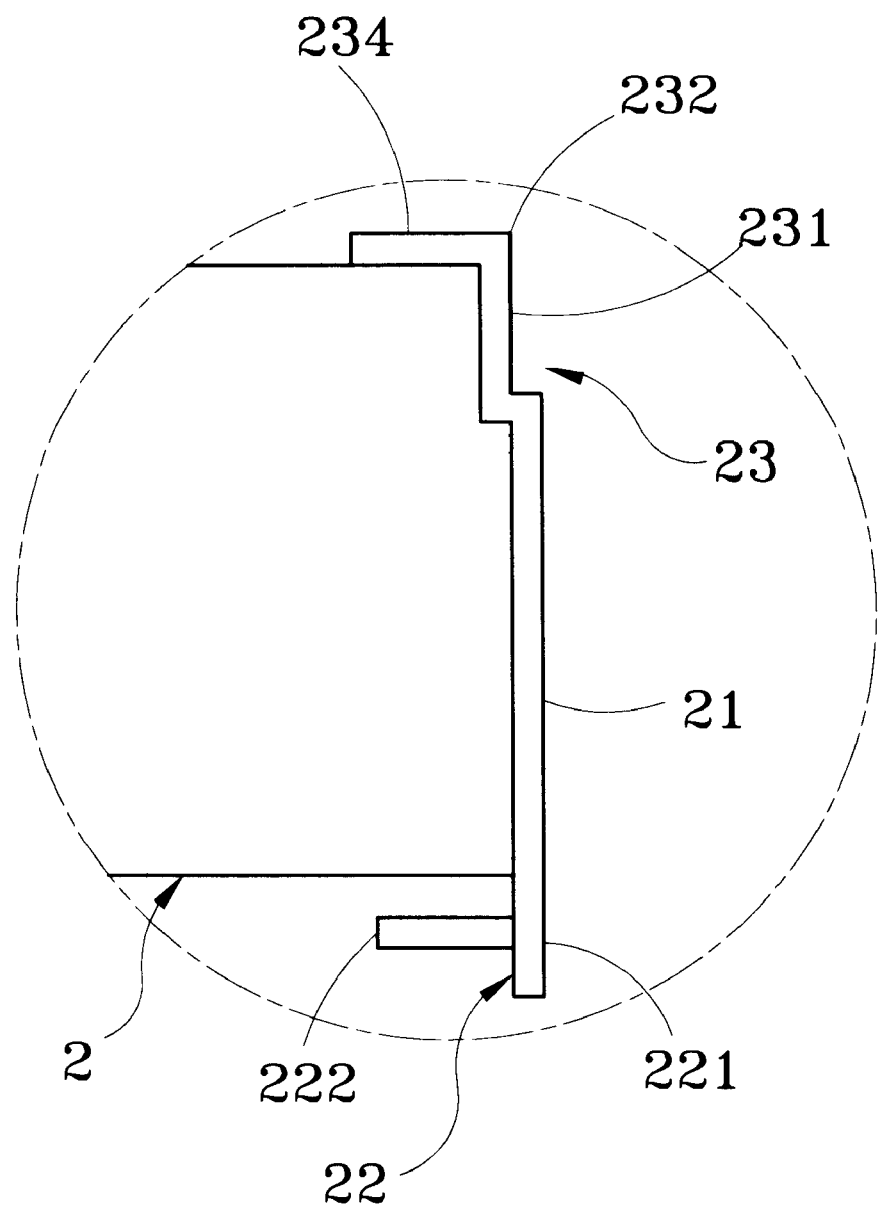
FIG. 2C is a locally enlarged view of FIG. 2B.

FIG. 1 is a schematic view of a structure of redundant arrays of inexpensive disks (R.A.I.D.) with servers according to one embodiment of the invention. FIG. 2A and FIG. 2B are exploded views of FIG. 1. FIG. 2C is a locally enlarged view of FIG. 2B.

With reference to FIG. 1, FIG. 2A, FIG. 2B and FIG. 2C, a R.A.I.D. 1 engages a server 2. A housing 3 covers the sever 2. First connectors 12 are formed on tops of sidewalls 11 of the R.A.I.D. 1. Second connectors 22 matching the first connectors 12 are formed on bottoms of sidewalls 21 of the server 2. With the engagement of the first connectors 12 and the second connectors 22, the R.A.I.D. 1 is further attached to server 2. The bottom of the server 2 is further provided with an opening 24 for receiving a signal wire 71 and a power wire 72. Furthermore, third connectors 23 are formed on tops of the sidewall 21. Fourth connectors 31 are formed on bottoms of sidewalls of the housing 3. With the engagement of the third connector 23 and the fourth connector 31, the server 2 is attached to the housing 3. A structure of the R.A.I.D. with the server 2 is thereby accomplished to increase the interior space for receiving more devices and simplifies the wiring of the devices.

The first connector 12 includes a first extension 121, a first support 124 which is connected to the first extension 121 to form a backbone 122, and a plurality of first slots 123. The second connector 22 includes a connection section 221 that has a plurality of connection members 222 matching the first slots 123.

The third connector 23 includes a second extension 231 and a second support 234 connected to the second extension 231 to form a backbone 232. A plurality of slots 233 is provided along the backbone 232. The fourth connector 31 includes a second connection section 311 that has a plurality of connection members 312 matching the second slots 233. Similar to the first connector 12, the server 2 can be connected to another server (not shown) via the third connector 23. Furthermore, similar to the second connector 22, the fourth connector 31 of the housing 3 is connected to the first connector of the R.A.I.D.

Figure 3:
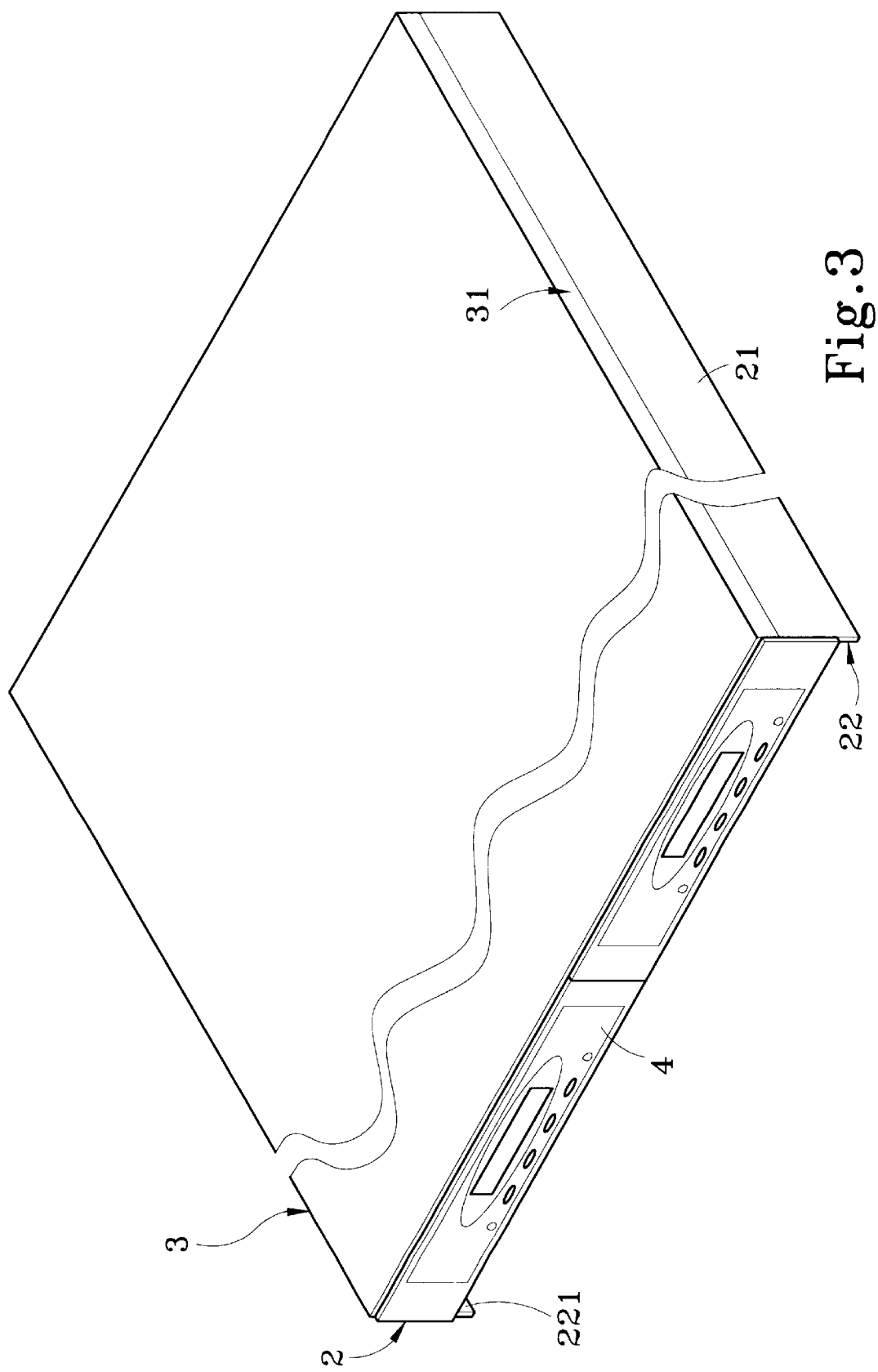
FIG. 3 is a schematic view of the structure in use according to one embodiment of the invention.

When in use, the R.A.I.D. 1 is formed according to industrious standard of 3U, 4U or 5U computer specification, and the server 2 is formed according to industrious standard of 1U or 2U computer specification. Currently, a plurality of portable hard disks 6 is arranged in a front half space of the R.A.I.D. 1. A transition plate 52 and a power supply 53 are arranged in the remaining space of the R.A.I.D. 1. The server 2 is stacked upon the R.A.I.D. 1. Hence, a motherboard 51, a CD-ROM drive 7 or a floppy disk drive 8 can be further arranged in the server 2 while connection wires and the power wires 72 can be also connected to the transition plate 52 and the power supply 53 through the opening 24. The device space and wiring limitations can be thereby overcome. For example, a control panel 4 of the R.A.I.D. 1 can be arranged in front of the server 2, as shown in FIG. 3 which is a schematic view of the structure in use according to one embodiment of the invention.

Figure 4:
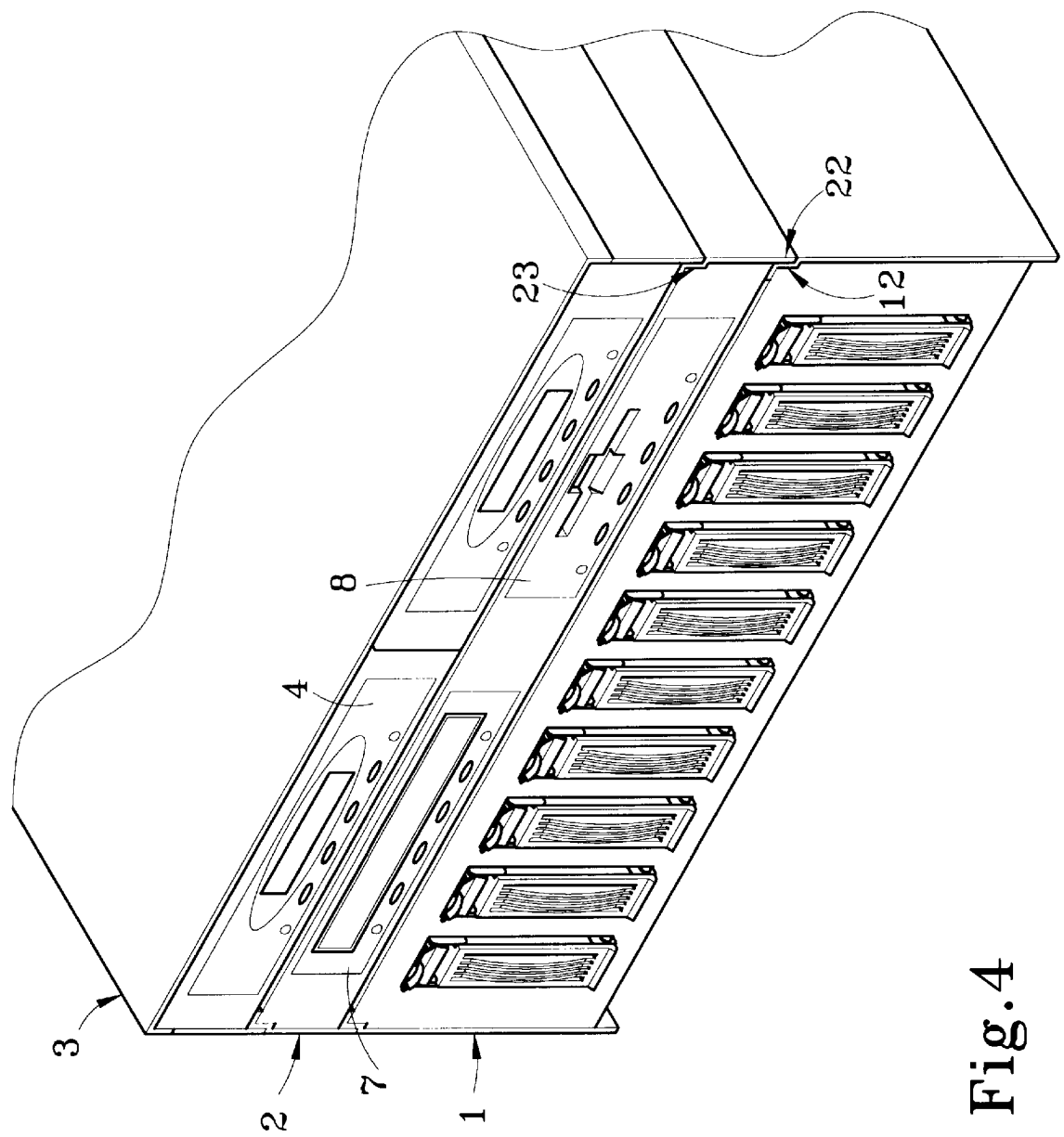
FIG. 4 is another schematic view of the structure in use according to one embodiment of the invention.

FIG. 4 is another schematic view of the structure in use according to one embodiment of the invention. The third connector 23 of the server 2 is connected to a second connector of another server (shown in FIG. 4). In this manner, the first server can receive the motherboard (not shown), the CD-ROM drive 7 and the floppy drive 8, and the second server can receive the control panel 4 of the R.A.I.D. 1. Alternatively, a plurality of servers can be further stacked upon the R.A.I.D. 1.

Figure 5A:
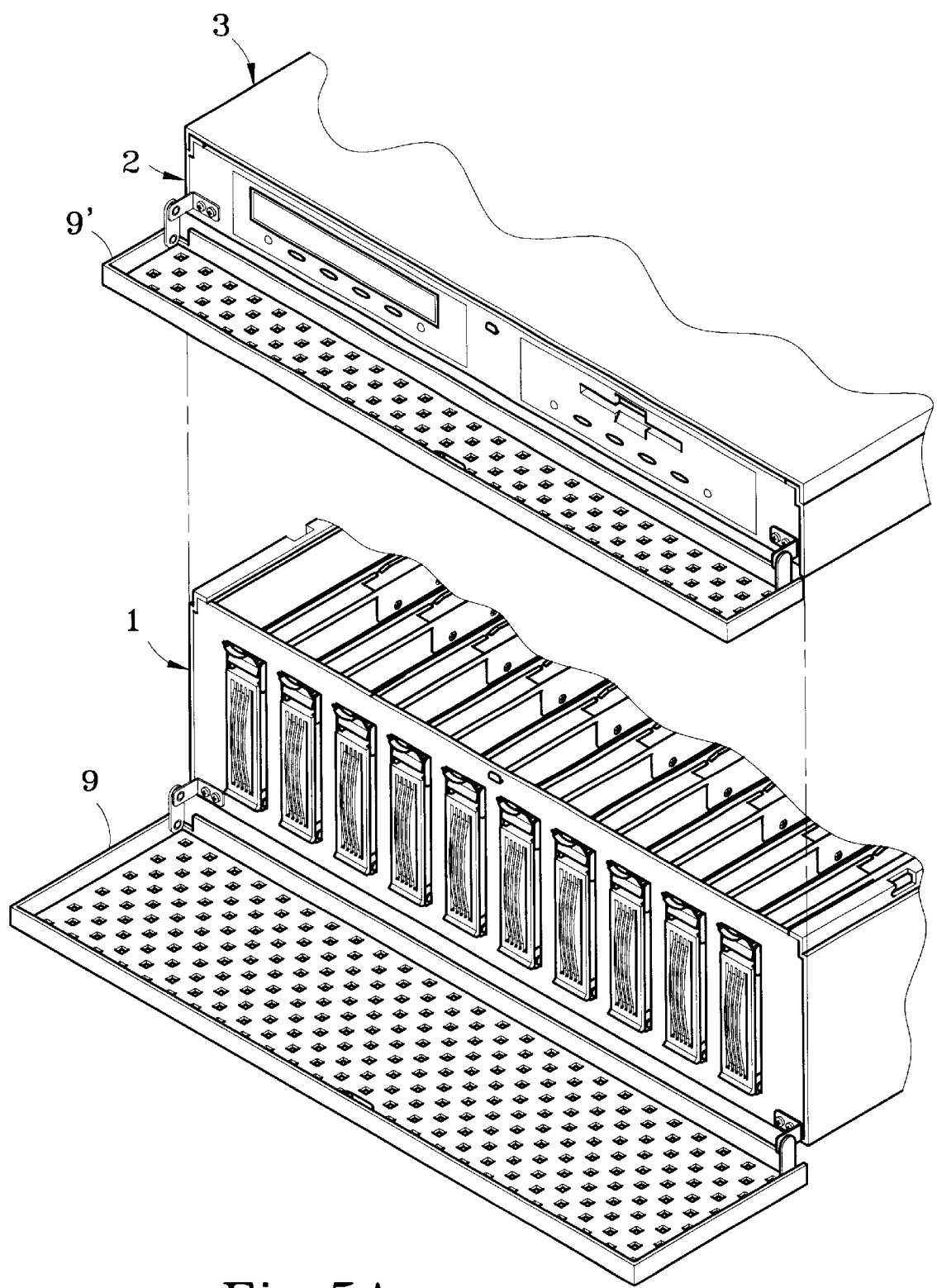
FIG. 5A and FIG. 5B are schematic views of the structure according to another embodiment of the invention.
Figure 5B:
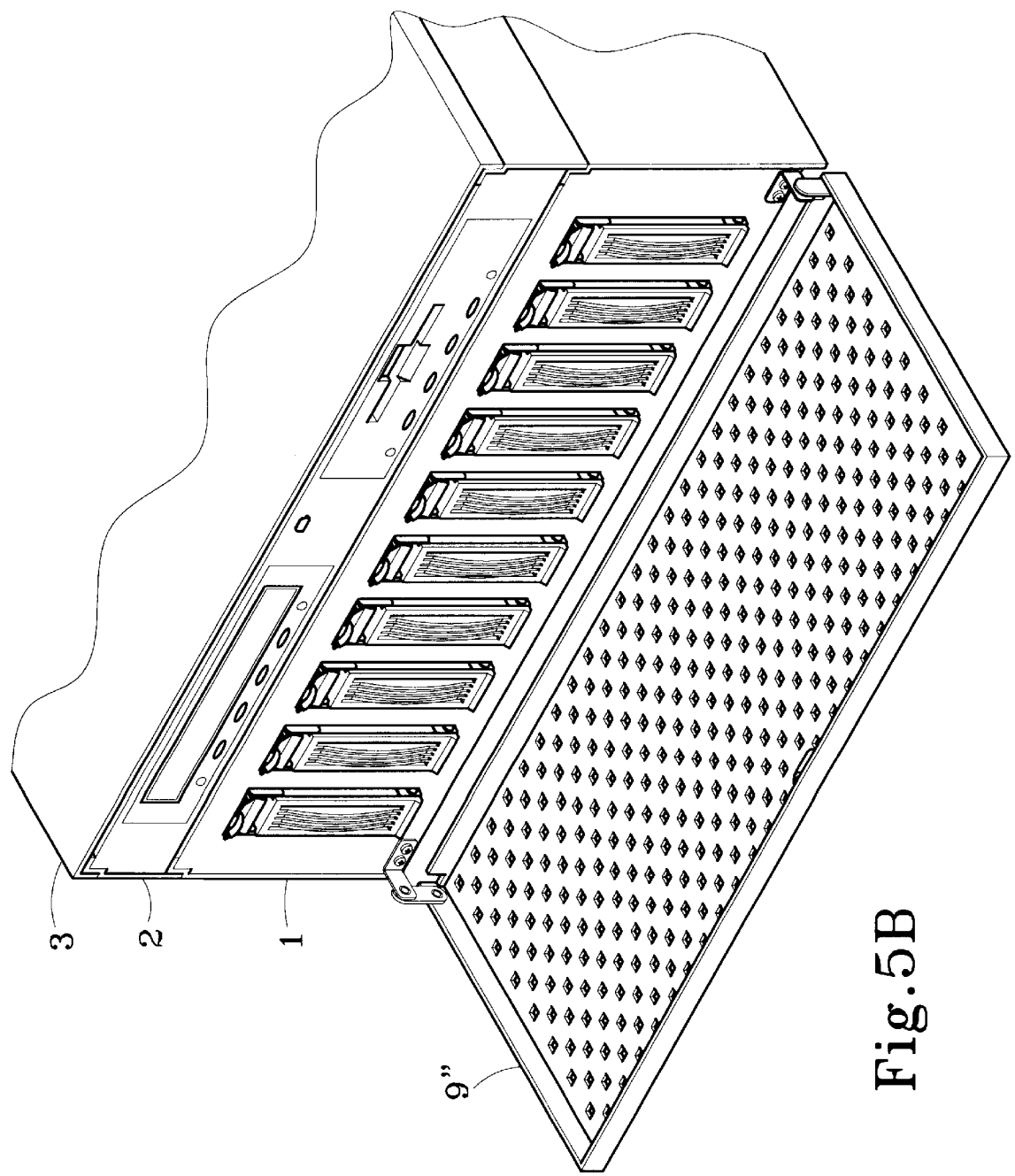

FIG. 5A and FIG. 5B show other views of the structure according to another embodiment of the invention. Dual-axle covers 9, 9' are further respectively provided at front surfaces of the R.A.I.D. 1 and the server 2 to protect the structure of the invention. The covers 9, 9' are pulled out and then upward in two stages to avoid the covers 9, 9' from colliding with each other and to draw out the devices such as portable hard disks.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A structure of redundant arrays of inexpensive disks (R.A.I.D.) with a server, comprising:

a plurality of first connectors formed on tops of sidewalls of the R.A.I.D.;

a plurality of second connectors matching the first connectors and formed on bottoms of sidewalls of the server; and a plurality of third connectors formed on tops of the sidewalls of the server;

wherein the R.A.I.D. (1) is attached to the server via the first connectors engaging the second connectors.

2. The structure of claim 1, wherein a housing having a plurality of fourth connectors on bottoms of sidewalls thereof is further provided to cover the server, and the third connectors are engaged with the fourth connectors to connect the server to the housing.

3. The structure of claim 1, wherein each first connector includes a first extension and a first support connected to the first extension to form a backbone along which a plurality of first slots are formed, and wherein each second connector includes a connection section that has a plurality of connection members matching the first slots.

4. The structure of claim 1, wherein the bottom of the server is further provided with an opening for receiving a signal wire and a power wire.

5. The structure of claim 1, wherein the R.A.I.D. complies with 3U or higher level specification.

6. The structure of claim 1, wherein the server complies with 1U or 2U specification.

7. The structure of claim 2, wherein each third connector includes a second extension and a second support connected to the second extension to form a backbone along which a plurality of slots are formed, and wherein each fourth connector includes a second connection section that has a plurality of connection members matching the second slots.

8. The structure of claim 2, wherein each third connector is similar to each first connector, and the server is connected to another server by engaging each third connector with each of a plurality of second connectors of another server.

9. The structure of claim 2, wherein each fourth connector is similar to each second connector, and each fourth connector of the housing is connected to each first connector of the R.A.I.D.

* * * * *